April 1, 1958   L. F. MOORE, JR   2,828,733
CHARCOAL GRILL
Filed July 2, 1954
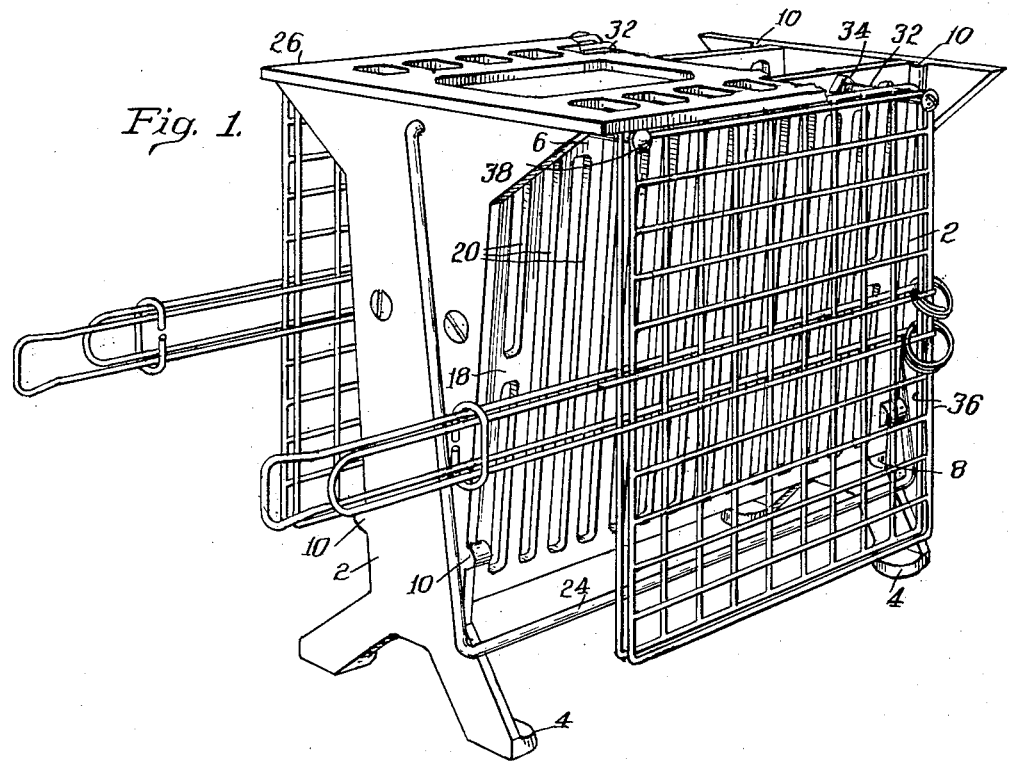
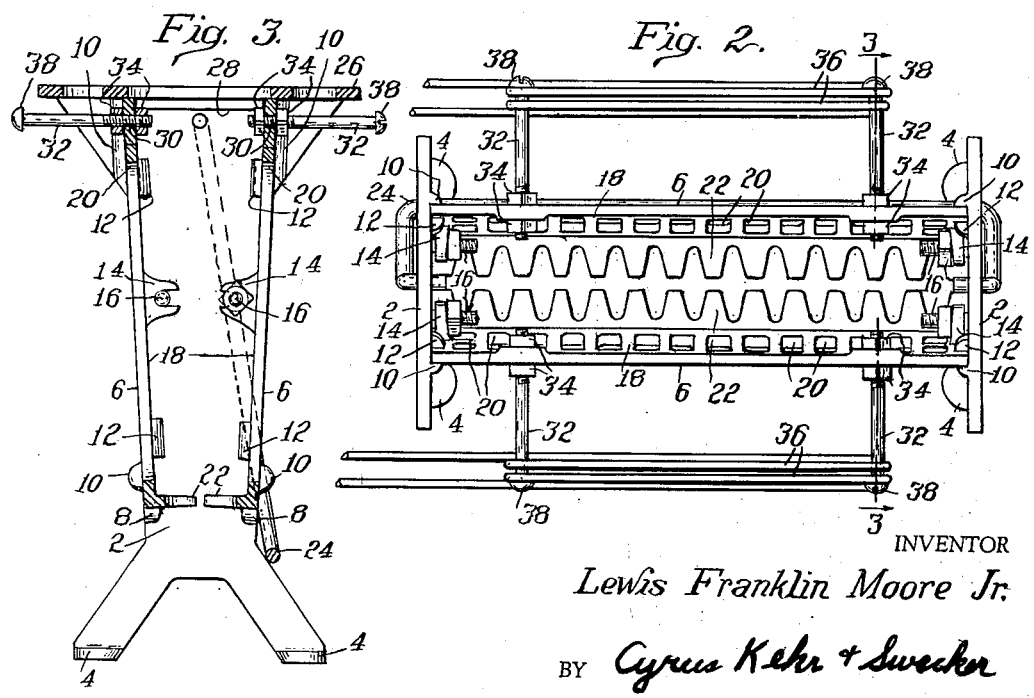
INVENTOR
Lewis Franklin Moore Jr.
BY Cyrus Kehr + Swecker
ATTORNEY United States Patent Office 2,828,733
Patented Apr. 1, 1958

2,828,733

CHARCOAL GRILL

Lewis Franklin Moore, Jr., Roanoke, Va., assignor to Walker Machine & Foundry Corporation, Roanoke, Va., a corporation of Virginia Application July 2, 1954, Serial No. 441,123

2 Claims. (Cl. 126—25)

This invention relates to a charcoal grill, and more specifically to a portable grill to be used outdoors for the preparation of meals.

It is an object of this invention to provide a simplified grill construction having a minimum number of parts, arranged for convenient assembly and disassembly. It is also an object of this invention to secure the top member of the grill against accidental displacement during use.

Still another object of the invention is to provide simplified means for supporting a food rack adjacent the side of the grill, which will permit adjustment of the position of the rack toward and away from the fire, but will prevent the accidental removal of the rack.

The grill construction according to this invention includes a pair of spaced apart end walls connected together by a pair of spaced apart grates. The end walls are provided with inward projections determining the positions for the grate members so as to facilitate assembly. The grate members include side wall portions and bottom wall portions, and together with the end walls, they define a chamber for the burning fuel. A top member rests upon the upper edges of the grate members and the end walls to support cooking vessels above the fire. Accidental displacement of the top member is prevented by projections extending down into the fire chamber. Secured near the upper edge of each of the grates is a pair of outwardly projecting pins upon which food racks may be suspended. The racks may be moved along the pins toward and away from the fire, but they are prevented from moving off the ends of the pins by enlarged heads thereon.

Other objects and advantages of this invention will appear as the description proceeds, in connection with the accompanying drawings in which:

Fig. 1 is a perspective view of a grill according to this invention, with a pair of food racks supported thereon, and with the top member partially broken off to reveal structural details;

Fig. 2 is a top plan view of the grill of Fig. 1, with the top member removed; and Fig. 3 is a vertical sectional view along the line 3—3 in Fig. 2, with the food racks removed.

The end walls 2 of the grill of this invention include foot portions 4 at the bottom thereof for supporting the grill on the ground or other support surface. On the inner faces of the end walls 2 are groups of projections for determining the positions of the grate members 6, to be attached to the end walls. Each grate 6 rests upon a projection 8, and is confined laterally by the projections 10 and 12, disposed, respectively, upon opposite sides of the grate. An ear 14 of each grate is secured to the adjacent end wall 2 by means of a bolt 16 passing through a hole in the end wall and a slot in the ear.

Each of the grates 6 includes a side wall portion 18, having a number of elongated slots 20 therein, through which air may pass to the combustion chamber and through which heat may be radiated laterally for cooking purposes. Each grate also includes a bottom wall portion 22 of a configuration best shown in Figure 2. It will be apparent that the bottom closure formed by a pair of bottom wall portions is discontinuous so as to provide for the passage of air upwardly to the combustion chamber and for the purpose of discharging ashes downwardly.

An elongated handle 24 is positioned, as shown, in holes in the end walls 2, being of sufficient resilience to permit of its being sprung into position. The unusual length of the handle 24 is advantageous when it becomes necessary to move the grill while there is a fire burning in the fire chamber, as it allows for a maximum distance between the hand and the fire.

A top member 26, shown in Figs. 1 and 3, rests upon the upper edges of the end walls 2 and the side wall portions 18 of the grates 6. Cooking vessels, such as coffee pots for example, may be placed upon the top member 26. Displacement of the top member 26 from its intended position is prevented by projections 28, Fig. 3, extending downwardly therefrom near the ends. Each of the projections 28 is of such dimensions and is so positioned as to lie closely adjacent the inner face of the adjacent end wall and the inner faces of both of the grates 6.

Extending outwardly through holes 30, near the upper ends of the grates 6, are pins 32. These pins may conveniently take the form of bolts, as shown, to facilitate their attachment to the grates. Nuts 34 are threaded onto each bolt 32, to engage opposite faces of the grates 6. The pins or bolts 32 support conventional food racks 36, as will be apparent from Figs. 1 and 2. The substantial extent of each of the bolts 32 allows for adjustment of the position of the food racks supported thereon toward and away from the fire, to control the amount of heat applied to the food. The heads 38 of the bolts 32 serve to prevent accidental removal of the racks 36 from the bolts.

The necessity for providing means for preventing accidental displacement of the top member and of the food racks will be appreciated when it is recalled that the cook must approach the hot grill very closely. With the heat of the fire on his face, his movements are often jerky and unsteady.

The above detailed description of an embodiment of this invention is offered as an example only, and the scope of the invention is to be ascertained from the claims which follow.

I claim:

1. A grill comprising spaced apart end walls, a pair of grates each including a side wall and a bottom wall portion integral with the side wall and inturned therefrom, said grates positioned between the end walls and coacting therewith to form a chamber therebetween for burning fuel, each of the end walls having a row of staggered inwardly extending projections and a lower projection spaced above the lower ends of said end wall along each vertical edge thereof, said staggered projections bearing against the opposite faces of each vertical end edge of each side wall and said lower projection supporting the bottom wall portion thereof, each of the side walls having an ear on the inner face thereof adjacent an end wall, a fastening connected with said ears and with the end walls for holding such end walls in place, a top member resting upon the upper edges of said end walls and side walls for supporting a cooking vessel thereon, said top member having projections near the ends thereof extending downwardly from the under side thereof into said chamber and adjacent the inside faces of both end walls and adjacent the inside faces of both side walls to prevent sliding motion of said top with respect to said side and end walls.

2. A grill comprising spaced apart end walls, a pair of grates each including a side wall and a bottom wall portion integral with the side wall and inturned therefrom, said grates positioned between the end walls and coacting therewith to form a chamber therebetween for burning fuel, each of the end walls having a row of staggered inwardly extending projections and a lower projection spaced above the lower ends of said end wall along each vertical edge thereof, said staggered projections bearing against the opposite faces of each vertical end edge of each side wall and said lower projection supporting the bottom wall portion thereof, each of the side walls having an ear on the inner face thereof adjacent an end wall, a fastening connected with said ears and with the end wall for holding such end wall in place, a top member resting upon the upper edges of said end walls and side walls for supporting a cooking vessel thereon, said top member having projections near the ends thereof extending downwardly from the under side thereof into said chamber and adjacent the inside faces of both end walls and adjacent the inside faces of both side walls to prevent sliding motion of said top with respect to said side and end walls, and a plurality of spaced apart pins each having the inner end thereof secured to said grate near the top thereof and extending only outwardly from the side of the grate remote from the chamber to support a food rack freely suspended in position to absorb the heat radiated through said grates, each of said pins having an enlarged abutment thereon to prevent accidental displacement of the rack off the ends of the pins.

References Cited in the file of this patent
UNITED STATES PATENTS

| | | |
|---|---|---|
| 2,048,769 | Anderson | July 28, 1936 |
| 2,173,166 | Hoelscher | Sept. 19, 1939 |
| 2,201,756 | Avetta | May 21, 1940 |
| 2,408,935 | Kunst | Oct. 8, 1946 |
| 2,447,938 | Garfunkle | Aug. 24, 1948 |
| 2,482,068 | Larson | Sept. 13, 1949 |
| 2,619,951 | Kahn | Dec. 2, 1952 |